(12) United States Patent
Arita (10) Patent No.: US 10,216,022 B2
(45) Date of Patent: Feb. 26, 2019

(54) DISPLAY DEVICE

(71) Applicant: Mitsubishi Electric Corporation, Tokyo (JP)

(72) Inventor: Kenji Arita, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/725,301

(22) Filed: Oct. 5, 2017

(65) Prior Publication Data

US 2018/0113352 A1 Apr. 26, 2018

(30) Foreign Application Priority Data

Oct. 26, 2016 (JP) ................ 2016-209499

(51) Int. Cl.
| | |
|---|---|
| *G06F 1/16* | (2006.01) |
| *G02F 1/1333* | (2006.01) |
| *F21V 8/00* | (2006.01) |
| *G06F 3/044* | (2006.01) |
| *G02F 1/1343* | (2006.01) |

(52) U.S. Cl.
CPC ..... *G02F 1/133308* (2013.01); *G02B 6/0055* (2013.01); *G02B 6/0083* (2013.01); *G02B 6/0088* (2013.01); *G06F 1/1601* (2013.01); *G06F 3/044* (2013.01); *G02F 1/13338* (2013.01); *G02F 1/13439* (2013.01); *G02F 2001/133311* (2013.01); *G02F 2001/133314* (2013.01); *G02F 2201/46* (2013.01); *G02F 2201/503* (2013.01); *G06F 2203/04103* (2013.01); *G06F 2203/04112* (2013.01)

(58) Field of Classification Search
CPC ................ G02B 6/0088; G02B 6/0055; G06F 2203/04112; G06F 2203/04103; G06F 1/1601; G06F 1/1603; G02F 1/133308; H05K 5/0017
See application file for complete search history.

(56) References Cited

U.S. PATENT DOCUMENTS

| | | | | |
|---|---|---|---|---|
| 9,341,875 | B2* | 5/2016 | Akatsuka | G02F 1/133308 |
| 9,411,455 | B2* | 8/2016 | Yoshikawa | G02F 1/133308 |
| 9,690,040 | B2* | 6/2017 | Poorter | G02F 1/133308 |
| 2007/0079537 | A1* | 4/2007 | Lee | G02F 1/133308 |
| | | | | 40/750 |

(Continued)

FOREIGN PATENT DOCUMENTS

| | | |
|---|---|---|
| JP | 2011-075605 A | 4/2011 |
| WO | 2013/140463 A1 | 9/2013 |

*Primary Examiner* — Hoa C Nguyen
*Assistant Examiner* — Keith DePew
(74) *Attorney, Agent, or Firm* — Studebaker & Brackett PC (57) ABSTRACT

A display device includes: a display panel; a protective member that is disposed on a display surface side of the display panel, and that has an end portion extending outward from an end portion of the display panel; a mold frame that is disposed on an opposite side to the display surface of the display panel, and that constitutes at least a side surface of a backlight except a back surface of the backlight; and a flange frame that is disposed outside the mold frame, and that includes a sidewall portion fixed to the mold frame, and a flange portion that is a peripheral portion extending outward from an upper end portion of the sidewall portion, the flange portion being fixed to a peripheral portion of the protective member.

8 Claims, 9 Drawing Sheets

(56) References Cited

U.S. PATENT DOCUMENTS

| | | | |
|---|---|---|---|
| 2011/0134359 A1* | 6/2011 | An | G06F 1/1601 |
| | | | 349/61 |
| 2014/0362328 A1* | 12/2014 | Kuroki | G02F 1/133308 |
| | | | 349/58 |
| 2015/0022753 A1* | 1/2015 | Akatsuka | G02F 1/133308 |
| | | | 349/58 |
| 2015/0253495 A1* | 9/2015 | Matsumoto | G06F 3/044 |
| | | | 345/174 |
| 2015/0277185 A1* | 10/2015 | Nam | G02F 1/133512 |
| | | | 349/58 |
| 2016/0085111 A1* | 3/2016 | Arita | G02F 1/133308 |
| | | | 349/58 |
| 2016/0313595 A1* | 10/2016 | Zhou | G02B 6/0055 |
| 2017/0363798 A1* | 12/2017 | Hirayama | G02B 6/0055 |
| 2018/0040437 A1* | 2/2018 | Tanaka | H01H 13/023 |
| 2018/0059317 A1* | 3/2018 | Kim | G02B 6/0055 |

* cited by examiner

DISPLAY DEVICE

BACKGROUND OF THE INVENTION

Field of the Invention

The present invention relates to a display device.

Description of the Background Art

As information electronic apparatuses have been widely used in recent years, display devices each including a display panel provided in its front surface with a protective member with solidity are widely used. A display apparatus with a display device uses a display panel of the display device that is bonded integrally with a protective member by glass bonding using transparent resin or the like in many cases. This is because of the following two reasons. The first reason is that deterioration in visibility due to surface reflection of light from outside needs to be prevented. The second reason is that a display device needs to be protected from shock from outside, and exposure to water and dust, for example. As a display device for in-vehicle application, a display device with a curved display panel used to improve vehicle interior space in design is coming into widespread use.

Here, a case of integrating a display panel of a display device and a protective member with each other is considered. In this case, the protective member needs to be larger in size than the display panel to improve the display device in design, so that there is required a frame capable of firmly fixing the protective member and the display panel to each other without deforming the protective member.

For example, PCT international Publication No. WO2013/140463 discloses an electronic apparatus with structure in which a reinforcement rib is provided along from a side surface of a mold frame to a surface of a flange portion, opposite to a surface to be bonded to a protection plate, to increase rigidity of the flange portion, thereby increasing rigidity of the protection plate.

Unfortunately, when the art described in PCT International Publication No. WO2013/140463 is used in a display device including a curved display panel, a warp or a deformation is liable to occur as compared with a display panel including members each of which is not formed in a curved shape because all members are formed in a curved shape, and thus it is difficult to form each of the members with high accuracy. In addition, when a protective member formed in a curved shape and a backlight are fixed to each other with a joint member, peel stress occurs the joint member by influence of a warp or a deformation of the protective member. This causes a problem in that the fixed protective member and backlight are unfixed.

SUMMARY OF THE INVENTION

It is an object of the present invention to provide a display device in which a protective member and a backlight can be firmly fixed to each other.

A display device according to the present invention includes a display panel, a protective member, a first frame, and a second frame. The protective member is disposed on a display surface side of the display panel, and has an end portion extending outward from an end portion of the display panel. The first frame is disposed on an opposite side to a display surface of the display panel, and constitutes at least a side surface of a backlight except a back surface of the backlight. The second frame is disposed outside the first frame, and includes a sidewall portion fixed to the first frame or in contact with the first frame, and a peripheral portion extending outward from an upper end portion of the sidewall portion, the peripheral portion being fixed to a peripheral portion of the protective member.

The display device includes: the display panel; the protective member that is disposed on the display surface side of the display panel, and that has the end portion extending outward from the end portion of the display panel; the first frame that is disposed on the opposite side to the display surface of the display panel, and that constitutes at least the side surface of the backlight except the back surface of the backlight; and the second frame that is disposed outside the first frame, and that includes the sidewall portion fixed to the first frame or in contact with the first frame, and the peripheral portion extending outward from the upper end portion of the sidewall portion, the peripheral portion being fixed to the peripheral portion of the protective member.

Thus, the first frame constituting at least the side surface of the backlight except the back surface of the backlight is held by the second frame, and the protective member is fixed to the second frame, so that a warp and a deformation of the protective member can be reduced. This enables the protective member and the backlight to be firmly fixed.

These and other objects, features, aspects and advantages of the present invention will become more apparent from the following detailed description of the present invention when taken in conjunction with the accompanying drawings.

DESCRIPTION OF THE PREFERRED EMBODIMENTS

Technical Premise

Figure 8:
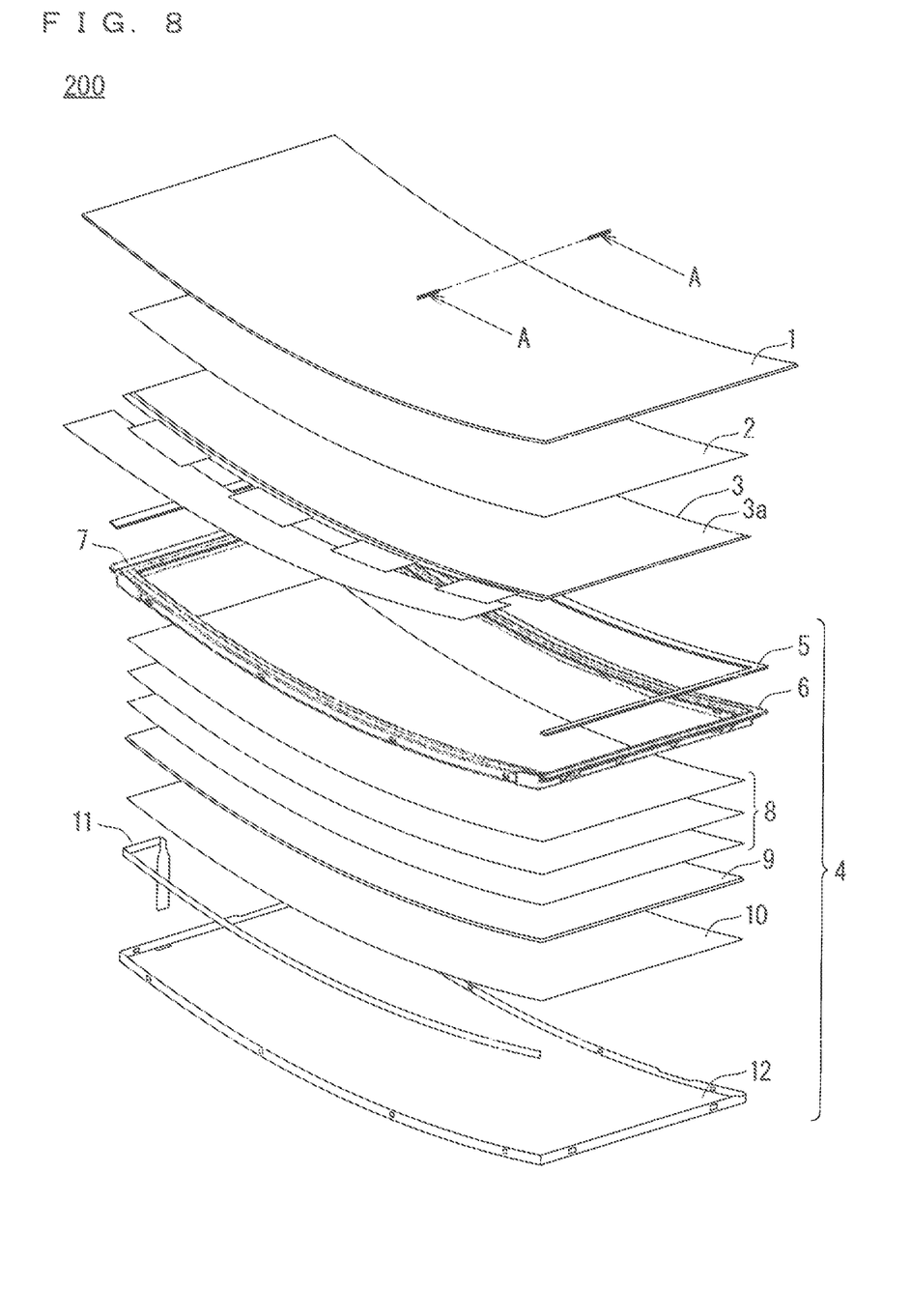
FIG. 8 is an exploded perspective view of a display device according to a technical premise.
Figure 9:
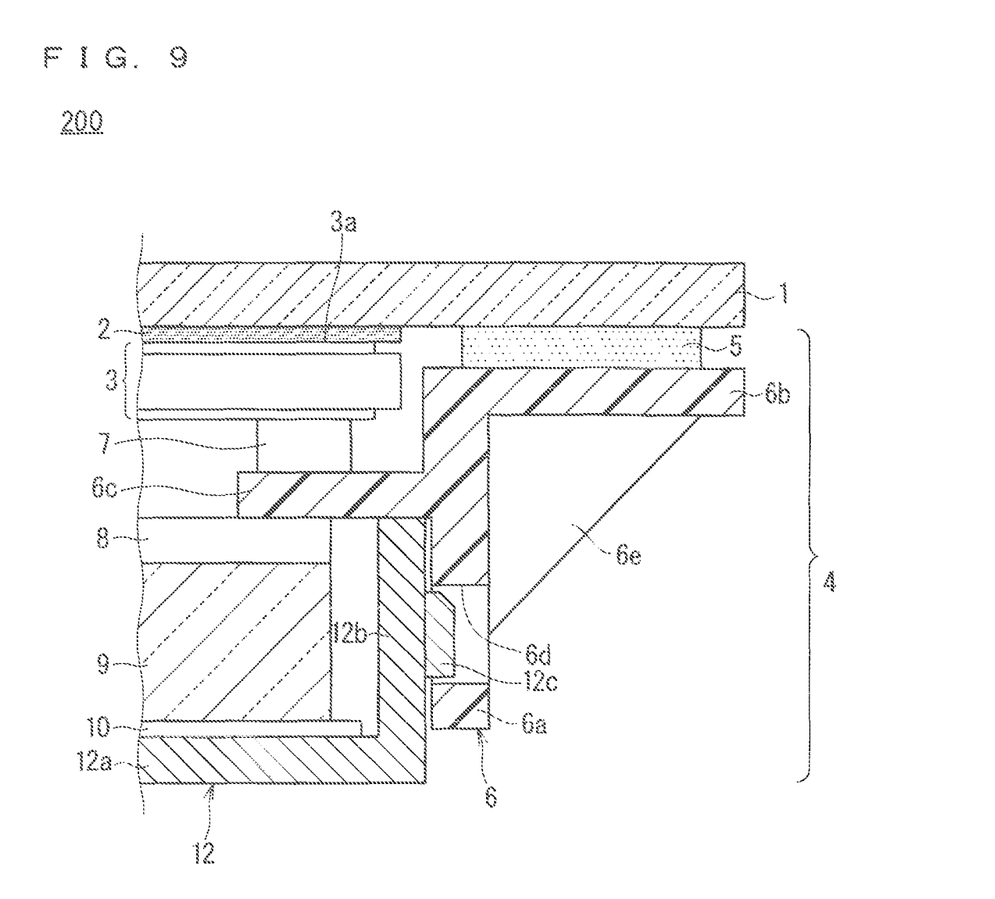
FIG. 9 is a sectional view taken along line A-A of FIG. 8.

First, with reference to FIGS. 8 and 9, a display device 200 according to a technical premise will be described. FIG. 8 is an exploded perspective view of the display device 200 according to the technical premise, and FIG. 9 is s sectional view taken along line A-A of FIG. 8. The display device 200 according to the technical premise is described as a case where a protective member 1 is increased in size, a mold frame 6 that can fix the protective member 1 and the display panel 3 to each other, and a display panel 3 with a curved screen, are provided, and the structure of PCT International Publication No. WO2013/140463 is used to increase rigidity of the protective member 1. For simplification of a drawing, every member in FIG. 9 is not illustrated in a curved shape.

As illustrated in FIGS. 8 and 9, the display device 200 includes the display panel 3, the protective member 1, and a backlight 4. The protective member 1 is disposed on a display surface 3a side of the display panel 3. The protective member 1 is formed not only in a rectangular shape like the display panel 3, but also in a shape with an end portion extending outward from an end portion of the display panel 3. More specifically, a contour of the protective member 1 in plan view is made larger than a contour of the display panel 3 in plan view. In a brief description of fixing structure between the protective member 1 and the display panel 3, the protective member 1 and the display panel 3 are fixed to each other through a first adhesive 2. While no touch panel is illustrated in FIGS. 8 and 9, a touch panel can be fixed between the protective member 1 and the display panel 3 through the first adhesive 2.

The backlight 4 is disposed on an opposite side to a display surface 3a of the display panel 3, or on a back surface side of the display panel 3. The backlight 4 includes a joint member 5, a mold frame 6, a cushion 7, an optical sheet 8, a light guide plate 9, a reflection sheet 10, a light source 11, and a rear frame 12. The rear frame 12 is used to house the optical sheet 8, the light guide plate 9, and the reflection sheet 10. The mold frame 6 is used to assemble and fix the optical sheet 8, the light guide plate 9, and the reflection sheet 10 to the rear frame 12 while they are housed in the rear frame 12.

The rear frame 12 includes a bottom wall portion 12a, a sidewall portion 12b, and a fitting tab 12c. The bottom all portion 12a extends inward from a lower end portion of the sidewall portion 12b, and is formed in a shape and a size to allow a back surface of the reflection sheet 10 constituting a part of the backlight 4 to be covered. More specifically, the bottom wall portion 12a is formed in a rectangular shape. In addition, a contour of the bottom wall portion 12a in plan view is made larger than a contour of the reflection sheet 10 in plan view. The fitting tab 12c is provided in the sidewall portion 12b of the rear frame 12.

The mold frame 6 is formed in a rectangular frame shape, and includes a sidewall portion 6a, a flange portion 6b, a flange portion 6c, a fitting hole 6d, and a reinforcement rib 6e. The mold frame 6 is disposed on a display surface 3a side of the rear frame 12. The sidewall portion 6a of the mold frame 6 is provided with the fitting hole 6d into which the fitting tab 12c of the rear frame 12 can be fitted. When the fitting tab 12c of the rear frame 12 is fitted into the fitting hole 6d of the mold frame 6, the mold frame 6 is fixed to the rear frame 12.

The sidewall portion 6a is provided at its upper end portion with a flange portion 6b extending outward. The flange portion 6b is fixed to the protective member 1 through the joint member 5. To increase the mold frame 6 in rigidity, the reinforcement rib 6e is provided along from an outer peripheral surface of the sidewall portion 6a in the mold frame 6 to a lower surface of the flange portion 6b. The sidewall portion 6a is provided with a flange portion 6c extending inward below the flange portion 6b. The flange portion 6c has a top surface on which the cushion 7 is disposed to support the display panel 3.

Unfortunately, a warp or a deformation is liable to occur as compared with a display panel including members each of which is not formed in a curved shape because all members are formed in a curved shape, and thus it is difficult to form each of the members with high accuracy. In addition, when the protective member 1 formed in a curved shape and the backlight 4 are fixed to each other with the joint member 5, peel stress occurs in the joint member 5 by influence of a warp or a deformation of the protective member 1. This causes a problem in that the fixed protective member 1 and backlight 4 are unfixed. A display device 100 according to a first preferred embodiment solves the problem as described above.

First Preferred Embodiment

Figure 1:
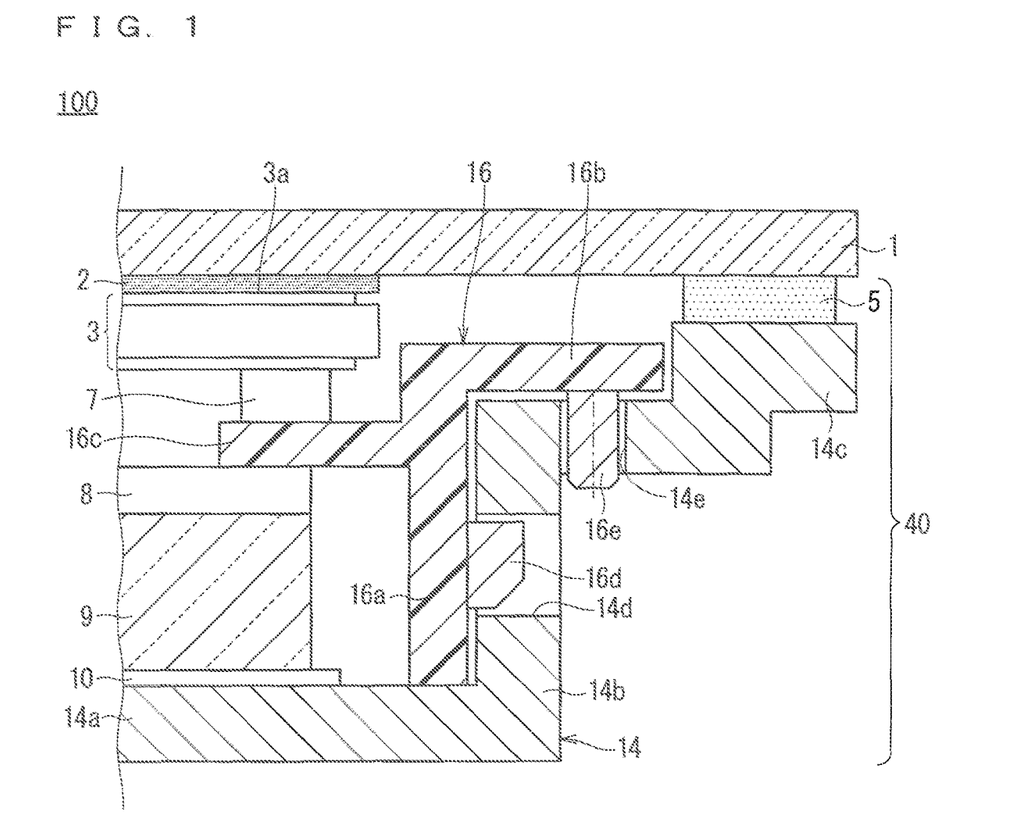
FIG. 1 is a sectional view of a display device according to a first preferred embodiment.
Figure 2:
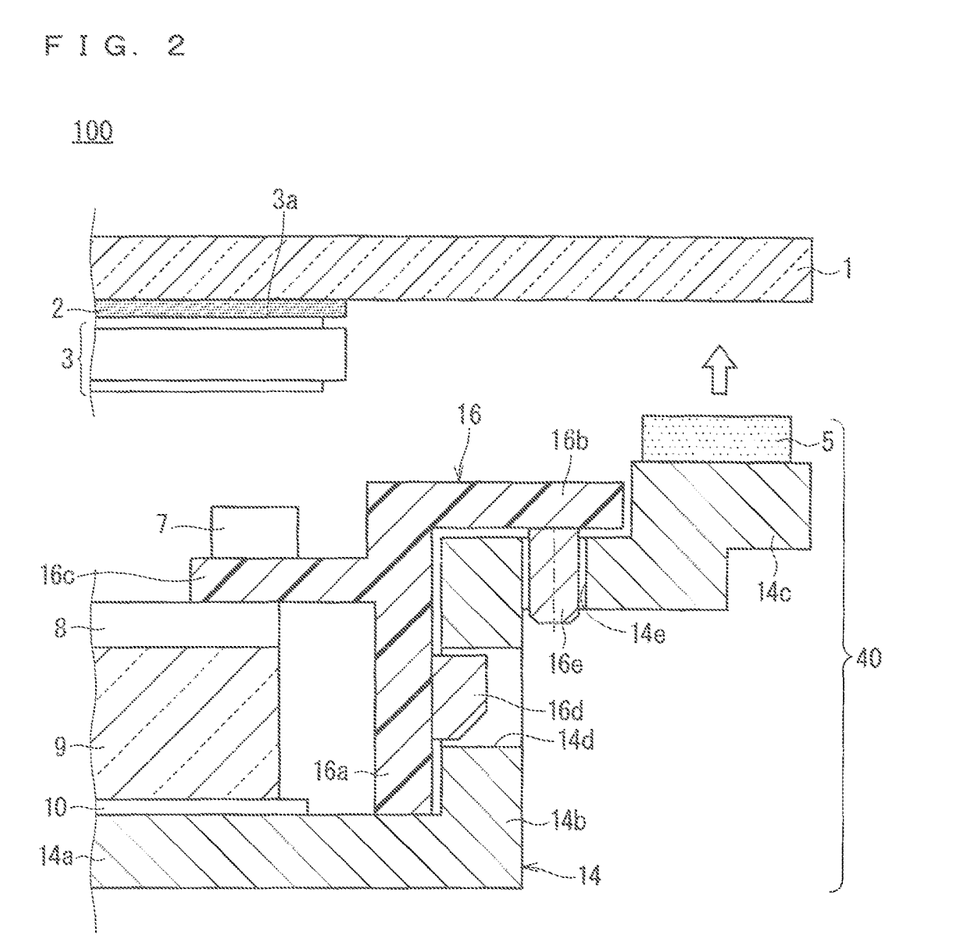
FIG. 2 is a sectional view illustrating a state where a backlight is separated in the display device according to the first preferred embodiment.

A first preferred embodiment of the present invention will be described with reference to drawings. FIG. 1 is a sectional view of a display device 100 according to the first preferred embodiment, and corresponds to FIG. 9 of the technical premise. FIG. 2 is a sectional view illustrating a state where a backlight 40 is separated in the display device 100. In the first preferred embodiment, the same component as that described in the technical premise is designated as the same reference sign to eliminate duplicated description.

As illustrated in FIGS. 1 and 2, the display device 100 includes a display panel 3, a protective member 1, and a backlight 40. The backlight 40 includes a joint member 5, a mold frame 16, a cushion 7, an optical sheet 8, a light guide plate 9, a reflection sheet 10, and a flange frame 14.

While there is no illustration in FIGS. 1 and 2, the backlight 40 includes a light source as with the technical premise. In the description below, the optical sheet 8, the light guide plate 9, the reflection sheet 10, and the light source each are also referred to as a component of the backlight. First, each member will be described in detail.

Display Panel

As the display panel 3, a plasma display panel, a liquid crystal panel, or the like is available. The liquid crystal panel applies birefringence of a liquid crystal, and includes: a first base plate that is an insulation base plate such as glass on which a coloring layer, a light-shielding layer, a counter electrode, and the like are formed; and a second base plate that is an insulation base plate such as glass on which a thin film transistor (hereinafter referred to as a "TFT") to be a switching element, a pixel electrode, and the like are formed. The display panel 3 further includes: a spacer to hold a distance between the first base plate and the second base plate; a sealant to bond a counter base plate and a TFT array base plate to each other; a liquid crystal put in between the counter base plate and the TFT array base plate; a sealant for an injection port for injecting the liquid crystal; an oriented film configured to allow to orient the liquid crystal; and a polarizing plate, for example.

Backlight

The backlight 4 includes at least a light source that emits light, and the mold frame 16a that holds a light guide plate through with light emitted from the light source is transmitted, for example, and irradiates the display panel 3. In the display device 100 of the present preferred embodiment, the backlight 4 irradiates the display panel 3 from a back surface side of the display panel 3, the back surface being opposite to the display surface 3a.

Mold Frame

The mold frame 16 as a first frame is disposed on an opposite side to the display surface 3a of the display panel 3. The mold frame 16 is formed of a resin molding.

The mold frame 16 constitutes at least a side surface of the backlight 40 except a back surface of the backlight 40. More specifically, the mold frame 16 is formed in a rectangular frame shape. The mold frame 16 includes a sidewall portion 16a, a flange portion 16b extending outward from an upper end portion of the sidewall portion 16a, a flange portion 16c extending inward from below the upper end portion of the sidewall portion 16a, a fitting tab 16d, and a protrusion 16e for positioning. As described above, the mold frame 16 constitutes the side surface and a front surface of the backlight 40 with the sidewall portion 16a and the flange portion 16c, respectively.

The fitting tab 16d is provided so as to project outward from the sidewall portion 16a. The protrusion 16e is provided in the periphery of the fitting tab 16d. More specifically, the protrusion 16e is provided so as to protrude downward from the flange portion 16b.

Touch Panel

The touch panel is used to convert information on a position coordinate input by an operator into an electric signal by using a circuit composed of a transparent electrode formed on a transparent base plate. Then, the touch panel transmits the converted electric signal to a control circuit being a terminal product through an output wiring member connected to the touch panel.

While no touch panel is illustrated in the present preferred embodiment, a touch panel of a projection capacity type is used in many cases in the present preferred embodiment. The touch panel of a projection capacity type detects a contact position with a fingertip of an operator, or the like, as coordinate data. Then the touch panel accurately detects a contact position with a fingertip of an operator, or the like, by measuring a ratio of the amount of electric currents flowing through a plurality of transparent electrodes at the contact position and around there. As upper and lower base plates constituting the touch panel, transparent glass is available, for example.

Protective Member

The protective member 1 is formed in a rectangular shape as with the touch panel and the display panel 3. The protective member 1 is disposed on a top surface of the touch panel or the display panel 3 to prevent the touch panel and the display panel 3 from receiving damage, deformation, abrasion, contamination, and the like, due to pressurization or contact from the outside. The protective member 1 is formed of almost transparent material such as glass and plastic. In the present preferred embodiment, glass with high strength, being less likely to deform, is used as the protective member 1.

As described above, the protective member 1 is formed in a shape such that its end portion extends outward from an end portion of the display panel 3. In addition, the protective member 1 is formed such that its thickness is more than a thickness of the touch panel. Specifically, when the protective member 1 has a thickness equal to or more than about twice a thickness of the touch panel, deformation or breakage of the touch panel can be avoided. In addition, printing or painting to a front surface or a back surface of the protective member 1 enables the protective member to further have a function of a design member.

Flange Frame

The flange frame 14 as a second frame holds the display panel 3, the touch panel, components of the backlight 4, the protective member 1, and the like. The flange frame 14 is formed of a metal formed part. The flange frame 14 may be also formed of a material containing metal other than the metal formed part. As the metal, aluminum and magnesium are available, for example.

The flange frame 14 is disposed outside the mold frame 16. The flange frame 14 includes a sidewall portion 14b, a bottom wall portion 14a, a flange portion 14c, a fitting hole 14d, and a hole 14e. The bottom wall portion 14a is formed in a rectangular shape. In addition the bottom wall portion 14a extends inward from a lower end portion of the sidewall portion 14b, and is formed in a size to allow a back surface of a component of the backlight 40 to be covered. More specifically, a contour of the bottom wall portion 14a in plan view is made larger than a contour of the reflection sheet 10 in plan view.

While the display device 200 according to the technical premise includes the rear frame 12, the display device 100 according to the present preferred embodiment does not include the rear frame 12. In the present preferred embodiment, the flange frame 14 houses the optical sheet 8, the light guide plate 9, and the reflection sheet 10.

The flange portion 14c is formed in a stepped portion in a peripheral portion extending outward from an upper end portion of the sidewall portion 14b.

The fitting hole 14d is provided at a portion in the sidewall portion 14b, the portion facing the fitting tab 16d of the mold frame 16, and the fitting tab 16d can be fitted into the fitting hole 14d. The hole 14e is provided at a portion in a peripheral portion of the flange frame 14, the portion facing the protrusion 16e of the mold frame 16. This enables the protrusion 16e to be inserted into the hole 14e.

Adhesive

The first adhesive 2 is used to bond the display panel 3 and the touch panel being a transparent member to each other. The second adhesive (not illustrated) is used to bond the touch panel and the protective member 1 to each other. The first adhesive 2 and the second adhesive each have almost the same refractive index as that of each of the display panel 3 and the touch panel, so that reflection on a surface between the respective members is eliminated to prevent deterioration in visibility due to surface reflection of light from outside. In addition, the first adhesive 2 and the second adhesive protect the display device 100 from shock from outside, and exposure to water and dust, for example. The first adhesive 2 and the second adhesive each may be a sheet-like adhesive, or may be a flowable adhesive that is used by being cured by UV or heat, for example.

Joint Member

The joint member 5 is a double-sided tape or an adhesive, and has a waterproof function and cushioning characteristics. In addition, the joint member 5 may have a structure in which a double-sided tape or an adhesive is applied to a cushioning member with a waterproof function and cushioning characteristics. When hardening resin or the like is used, adhesion increases as time elapses, and thus adhesion of the joint member 5 can be further improved. The joint member 5 can be used at a portion between the backlight 40 and the protective member 1, or a portion between the display panel 3 and the backlight 40, or can be used in both the portions.

Display Device

Subsequently, characteristic structure in the present preferred embodiment will be described in detail. As illustrated in FIGS. 1 and 2, the protective member 1 is fixed to the display panel 3 through the first adhesive 2. When the touch panel is mounted, the touch panel is mounted between the protective member 1 and the display panel 3, and then the touch panel is fixed to the protective member 1 through the first adhesive 2. In addition, the touch panel is fixed to the display panel 3 through the second adhesive disposed between the touch panel and the display panel 3. Between the mold frame 16 and the flange frame 14, the optical sheet 8, the light guide plate 9, the reflection sheet 10, and the light source are housed.

In addition, the cushion 7 is fixed to a top surface of the flange portion 16c of the mold frame 16, or a surface on a display surface 3a side, through adhesive to protect the display panel 3 or to prevent ingress of foreign material. The joint member 5 is disposed to fix the protective member 1 and the backlight 40 to the flange portion 14c of the flange frame 14.

Subsequently, the flange frame 14 will be described in detail. The flange frame 14 is provided in its peripheral portion with the hole 14e into which the protrusion 16e of the mold frame 16 is inserted. The protrusion 16e is inserted into the hole 14e to perform positioning of the mold frame 16 and the flange frame 14 in a crosswise direction in a paper-surface of each of FIGS. 1 and 2.

The sidewall portion 14b of the flange frame 14 is provided with the fitting hole 14d into which the fitting tab 16d of the mold frame 16 is fitted. When the fitting tab 16d is fitted into the fitting hole 14d, the flange frame 14 is fixed to the mold frame 16 while positioning of the mold frame 16 and the flange frame 14 in the vertical direction in the paper-surface of each of FIGS. 1 and 2, or in the thickness direction of the backlight 40, is performed.

While each of the fitting hole 14d, the hole 14e, the fitting tab 16d, and the protrusion 16e, is disposed on all sides in an outer peripheral portion of the backlight 40, the number of fitting holes 14d, holes 14e, fitting tabs 16d, and protrusions 16e, disposed in each side is not limited. A plurality of fitting holes 14d, holes 14e, fitting tabs 16d, and protrusions 16e needs to be disposed in each side so as to resist use environment of the display device 100. The use environment of the display device 100 includes vibration and shock that are applied to the display device 100 when the display device 100 is used.

To resist the use environment of the display device 100, a thickness of the flange frame 14 needs to be 1.5 or more times a thickness of the mold frame 16. For example, a thickness of the flange frame 14 needs to be 1.5 mm or more with respect to a thickness of 1.0 mm of the mold frame 16. The mold frame 16 is a resin molding, and has low rigidity. Thus, when a metal molding is used as the flange frame 14, the backlight 40 with high rigidity can be fabricated. Alternatively, a resin frame molded by inserting metal as the flange frame 14 is expected to have a similar effect.

Subsequently, bonding of the protective member 1, the display panel 3, and the backlight 4 will be simply described with reference to FIG. 2. The protective member 1 and the display panel 3 are preliminarily fixed through the first adhesive 2 to fabricate a display unit, and each of the backlight 40 and the display unit is set in a fixture, or the like. Then, the protective member 1 and the backlight 40 are fixed to each other through the joint member 5 to complete the display device 100.

As described above, the display device 100 according to the first preferred embodiment includes: the display panel 3; the protective member 1 that is disposed on the display surface 3a side of the display panel 3, and that has the end portion extending outward from the end portion of the display panel 3; the mold frame 16 that is disposed on an opposite side to the display surface 3a of the display panel 3, and that constitutes at least the side surface of the backlight 40 except the back surface of the backlight 40; and the flange frame 14 that is disposed outside the mold frame 16, and that includes the sidewall portion 14b fixed to the mold frame 16, and the flange portion 14c that is a peripheral portion extending outward from the upper end portion of the sidewall portion 14b, the flange portion 14c being fixed to a peripheral portion of the protective member 1.

Thus, the mold frame 16 constituting at least the side surface of the backlight 40 except the back surface of the backlight 40 is held by the flange frame 14, and the protective member 1 is fixed to the flange frame 14, so that warp and deformation of the protective member 1 can be reduced. This enables the protective member 1 and the backlight 40 to be firmly fixed.

While warp or deformation occurs in the display panel 3 to cause display unevenness, the warp and deformation of the display panel 3 can be reduced by reducing warp and deformation of the protective member 1, thereby enabling display unevenness to be reduced.

The fitting tab 16d is provided at a portion of the mold frame 16, the portion facing the sidewall portion 14b of the flange frame 14, and the fitting hole 14d into which the fitting tab 16d can be fitted is provided in the sidewall portion 14b of the flange frame 14, so that the flange frame 14 and the mold frame 16 are fixed to each other by fitting the fitting tab 16d into the fitting hole 14d.

Thus, the flange frame 14 can be fixed to the mold frame 16 while positioning of the mold frame 16 and the flange frame 14 in the vertical direction in the paper-surface of each of FIGS. 1 and 2, or in the thickness direction of the backlight 40, is performed. This enables the protective member 1 and the backlight 40 to be firmly and accurately fixed.

The protrusion 16e for positioning is provided in the periphery of the fitting tab 16d in the mold frame 16, and the hole 14e into which the protrusion 16e can be inserted is provided in the periphery of the fitting hole 14d in flange frame 14, so that positioning of the mold frame 16 and the flange frame 14 in the crosswise direction in the paper-surface of each of FIGS. 1 and 2 can be performed. This enables the protective member 1 and the backlight 40 to be firmly and accurately fixed.

The flange frame 14 has a thickness 1.5 or more times a thickness of the mold frame 16, so that the flange frame 14 can resist use environment of the display device 100 by increasing its rigidity.

The flange frame 14 is formed of metal by mold fabrication, so that the backlight 40 with high rigidity can be fabricated.

Alternatively, the flange frame 14 is molded by inserting metal into a resin molding, so that the backlight 40 with high rigidity can be fabricated as with that formed of metal by mold fabrication.

Second Preferred Embodiment

Figure 3:
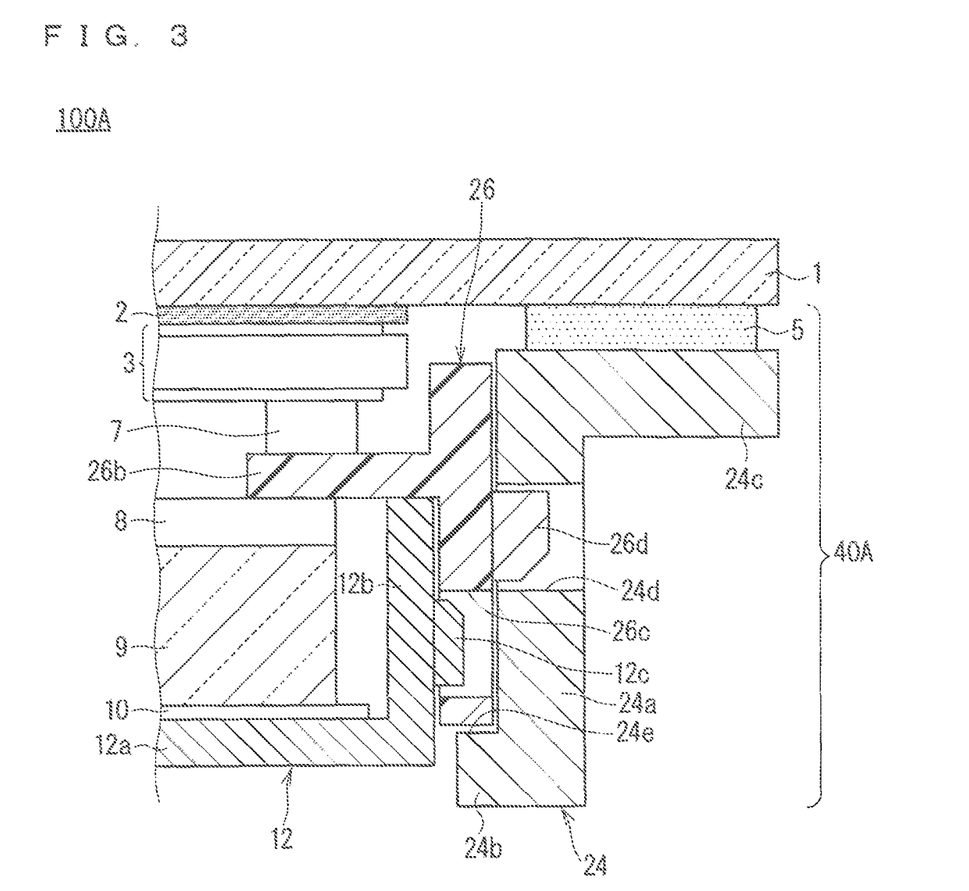
FIG. 3 is a sectional view of a display device according to a second preferred embodiment.
Figure 4:
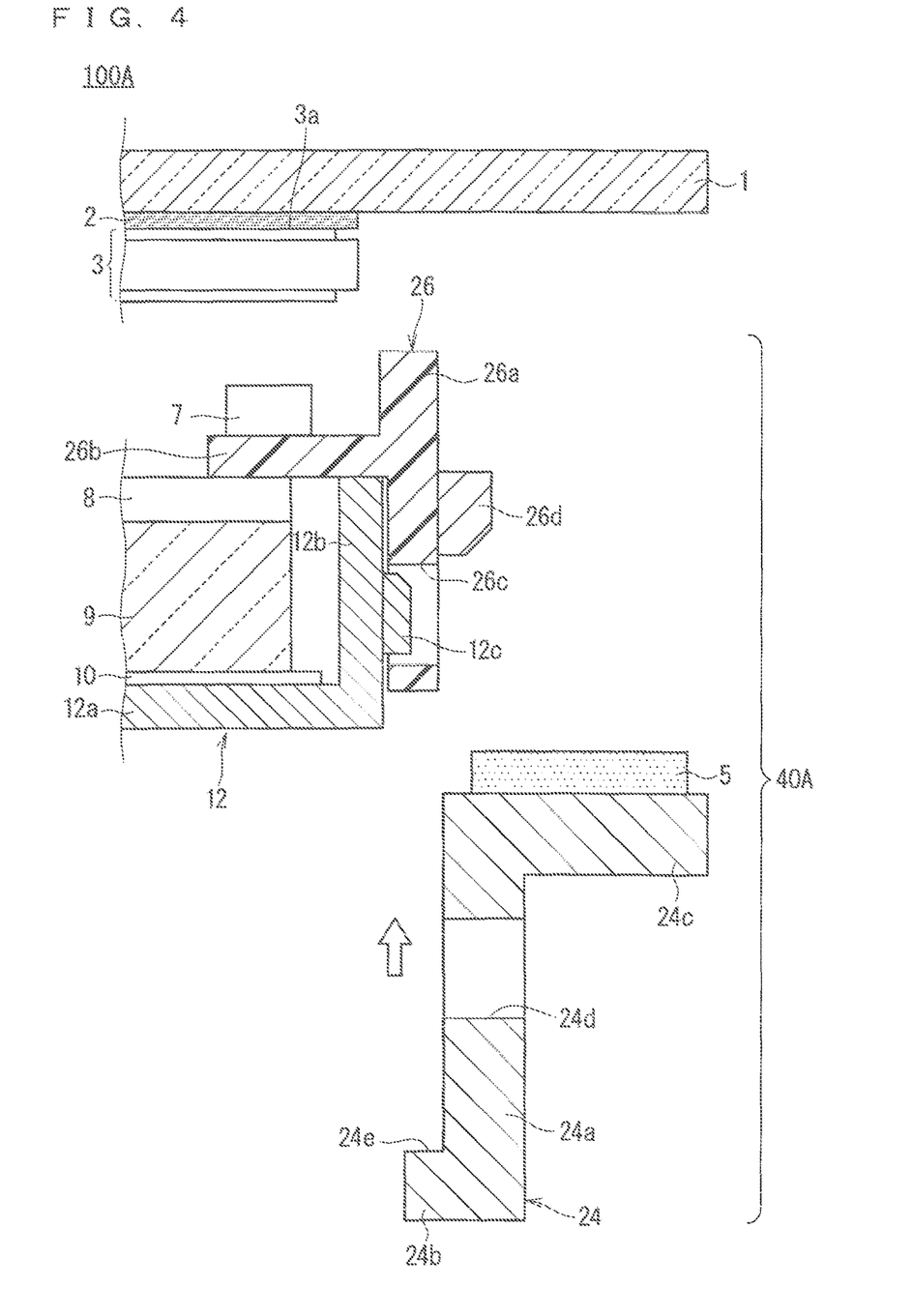
FIG. 4 is a sectional view illustrating a state where a backlight is separated from a flange frame in the display device according to the second preferred embodiment.

Subsequently, a display device 100A according to a second preferred embodiment will be described. FIG. 3 is a sectional view of the display device 100A according to the second preferred embodiment, and FIG. 4 is a sectional view illustrating the display device 100A in a state where a backlight 40A and a flange frame 24 are separated from each other. In the second preferred embodiment, the same component as that described in the first preferred embodiment is designated as the same reference sign to eliminate duplicated description.

As illustrated in FIGS. 3 and 4, the display device 100A includes a display panel 3, a protective member 1, and a backlight 40A. The backlight 40A includes a joint member 5, a mold frame 26 as a first frame, a cushion 7, an optical sheet 8, a light guide plate 9, a reflection sheet 10, a light source (not illustrated), a rear frame 12, and a flange frame 24 as a second frame.

The mold frame 26 constitutes at least a side surface of the backlight 40A except a back surface of the backlight 40A. More specifically, the mold frame 26 is formed in a rectangular frame shape. In addition, the mold frame 26 includes a sidewall portion 26a, a flange portion 26b, a fitting hole 26c, and a fitting tab 26d. The flange portion 26b extends inward below an upper end portion of the sidewall portion 26a. As described above, the mold frame 16 constitutes the side surface and a front surface of the backlight 40 with the sidewall portion 26a and the flange portion 26b, respectively.

The fitting hole 26c is provided at a portion in the sidewall portion 26a, the portion facing the fitting tab 12c of the rear frame 12, and the fitting tab 12c can be fitted into the fitting hole 26c. The fitting tab 26d is provided in the periphery of the fitting hole 26c in the sidewall portion 26a, and is more specifically provided above the fitting hole 26c in the sidewall portion 26a so as to project outward from the sidewall portion 26a.

The flange frame 24 holds the display panel 3, a touch panel, components of the backlight 40A, the protective member 1, and the like. The flange frame 24 is formed of a metal formed part. The flange frame 24 may be also formed of a material containing metal other than the metal formed part. As the metal, aluminum and magnesium are available, for example.

The flange frame 24 is formed in a rectangular frame shape. In addition, the flange frame 24 includes a sidewall portion 24a, a bottom wall portion 24b, a flange portion 24c, and a fitting hole 24d. The bottom wall portion 24b slightly extends inward from a lower end portion of the sidewall portion 24a. The bottom wall portion 24b is formed in a rectangular frame shape as with the sidewall portion 24a. The bottom wall portion 24b is provided on its entire top surface with a contact portion 24e. The contact portion 24e is formed in a plane shape so that a lower end portion of the sidewall portion 26a of the mold frame 26 is brought into contact with the contact portion 24e to enable positioning of the mold frame 26.

The flange portion 24c is formed in a peripheral portion extending outward from an upper end portion of the sidewall portion 24a. The fitting hole 24d is provided at a portion in the sidewall portion 24a, the portion facing the fitting tab 26d of the mold frame 26, and the fitting tab 26d can be fitted into the fitting hole 24d.

While each of the fitting hole 24d and the fitting tab 26d is disposed on all sides in an outer peripheral portion of the backlight 40A, the number of fitting holes 24d and the fitting tabs 26d disposed in each side is not limited. A plurality of fitting holes 24d and fitting tabs 26d needs to be disposed in each side so as to resist use environment of the display device 100A.

Subsequently, a typical method of assembling a backlight will be described. First, components of the backlight 40A are mounted in the rear frame 12, and the mold frame 26 is disposed outside the rear frame 12. When the fitting tab 12c of the rear frame 12 is fitted into the fitting hole 26c of the mold frame 26, the mold frame 26 is fixed to the rear frame 12 to complete a typical backlight. However, the structure is lacking in rigidity as it is, so that the flange frame 24 is fixed to the mold frame 26 to increase the rigidity. This enables the backlight 40A with high rigidity to be achieved.

Subsequently, a method of fixing the flange frame 24 will be described. As illustrated in FIG. 4, the flange frame 24 is fitted outside the mold frame 26 from a back surface side of the rear frame 12. More specifically, when the fitting tab 26d of the mold frame 26 is fitted into the fitting hole 24d of the flange frame 24, the flange frame 24 is fixed to the mold frame 26 while positioning of the mold frame 26 and the flange frame 24 in the vertical direction in the paper-surface of each of FIGS. 3 and 4, or in the thickness direction of the backlight 40A, is performed.

In addition, the lower end portion of the sidewall portion 26a of the mold frame 26 is brought into contact with the contact portion 24e of the flange, frame 24 to perform positioning of the backlight 40A in its thickness direction. This enables the display device 100A including the backlight 40A with high rigidity to be achieved as with the first preferred embodiment.

As described above, the display device 100A according to the second preferred embodiment includes the contact portion 24e to allow a lower end portion of the mold frame 26 to be brought into contact with the bottom wall portion 24b extending inward from the lower end portion of the sidewall portion 24a of the flange frame 24, so that positioning of the mold frame 26 is performed.

This further enables positioning of the backlight 40A in its thickness direction, so that the protective member 1 and the backlight 40A can be firmly and accurately fixed to each other.

Third Preferred Embodiment

Figure 5:
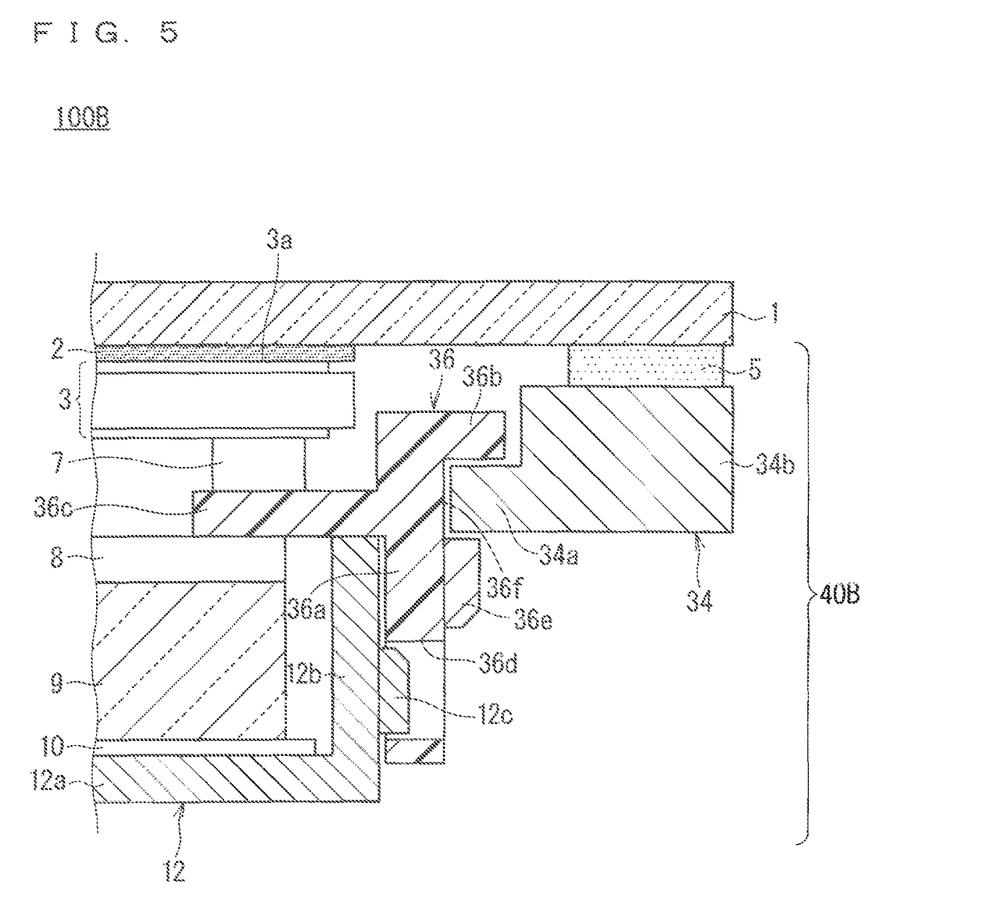
FIG. 5 is a sectional view of a display device according to a third preferred embodiment.

Subsequently, a display device 100B according to a third preferred embodiment will be described. FIG. 5 is s sectional view of the display device 100B according to the third preferred embodiment. In the third preferred embodiment, the same component as that described in each of the first and second preferred embodiments is designated as the same reference sign to eliminate duplicated description.

As illustrated in FIG. 5, the display device 100B according to the third preferred embodiment includes a display panel 3, a protective member 1, and a backlight 40B. The backlight 40B includes a joint member 5, a mold frame 36 as a first frame, a cushion 7, an optical sheet 8, a light guide plate 9, a reflection sheet 10, a light source (not illustrated), a rear frame 12, and a flange frame 34 as a second frame.

The mold frame 36 constitutes at least a side surface of the backlight 40B except a back surface of the backlight 40B. More specifically, the mold frame 36 is formed in a rectangular frame shape. In addition, the mold frame 36 includes a sidewall portion 36a, a flange portion 36b, a flange portion 36c, a fitting hole 36d, a fitting tab 36e, and a recessed portion 36f. The flange portion 36b extends outward from an upper end portion of the sidewall portion 36a. The flange portion 36c extends inward below the upper end portion of the sidewall portion 36a. As described above, the mold frame 36 constitutes the side surface and a front surface of the backlight 40B with the sidewall portion 36a and the flange portion 36c, respectively.

The fitting hole 36d is provided at a portion facing the fitting tab 12c of the rear frame 12, in the sidewall portion 36a, and the fitting tab 12c can be fitted into the fitting hole 36d. The fitting tab 36e is provided in the periphery of the fitting hole 36d in the sidewall portion 36a, and is more specifically provided above the fitting hole 36d in the sidewall portion 36a so as to project outward from the sidewall portion 36a.

The recessed portion 36f is provided between the flange portion 36b and the fitting tab 36e. More specifically, the recessed portion 36f is formed in a region surrounded by the flange portion 36b and the fitting tab 36e in an outer peripheral surface of the mold frame 36.

The flange frame 34 holds the display panel 3, a touch panel, components of the backlight 40B, the protective member 1, and the like. The flange frame 34 is formed of a metal formed part. The flange frame 34 may be also formed of a material containing metal other than the metal formed part. As the metal, aluminum and magnesium are available, for example.

The flange frame 34 is formed in a rectangular frame shape. In addition, the flange frame 34 includes a sidewall portion 34a, a flange portion 34b, and a screw hole 34c. The sidewall portion 34a is provided along an inner peripheral portion of the flange frame 34, and is formed so as to be able to come into contact with the recessed portion 36f. More specifically, a portion facing the recessed portion 36f in the sidewall portion 34a, or a leading end portion of the sidewall portion 34a, is formed in a substantially identical size to that of the recessed portion 36f, and thus can come into contact with the recessed portion 36f.

Each of the fitting tab 36e and the recessed portion 36f may be provided along throughout an outer peripheral portion of the mold frame 36, and a plurality of the fitting tabs 36e and the recessed portions 36f may be provided on each side in the outer peripheral portion of the mold frame 36.

As described above, the display device 100B according to the third preferred embodiment includes: the display panel 3; the protective member 1 that is disposed on the display surface 3a side of the display panel 3, and that has the end portion extending outward from the end portion of the display panel 3; the mold frame 36 that is disposed on an opposite side to the display surface 3a of the display panel 3, and that constitutes at least the side surface of the backlight 40B except the back surface of the backlight 40B; and the flange frame 34 that is disposed outside the mold frame 36, and that includes the sidewall portion 34a in contact with the mold frame 36, and a peripheral portion extending outward from an upper end portion of the sidewall portion, the peripheral portion being fixed to a peripheral portion of the protective member 1.

Thus, the mold frame 36 constituting at least the side surface of the backlight 40B except the back surface of the backlight 40B is held by the flange frame 34, and the protective member 1 is fixed to the flange frame 34, so that warp and deformation of the protective member 1 can be reduced. This enables the protective member 1 and the backlight 40B to be firmly fixed.

While warp or deformation occurs in the display panel 3 to cause display unevenness, the warp and deformation of the display panel 3 can be reduced by reducing warp and deformation of the protective member 1, thereby enabling display unevenness to be reduced.

Figure 6:
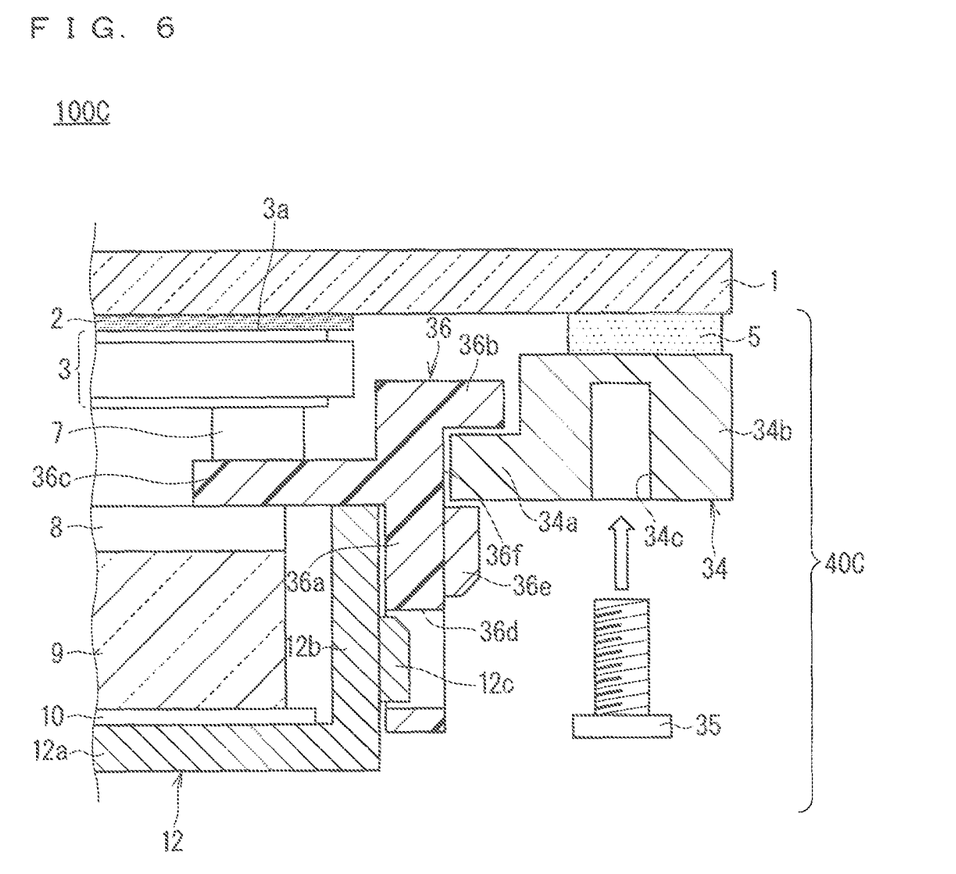
FIG. 6 is a sectional view illustrating a state before a screw is attached to a display device according to a first modification of the third preferred embodiment.
Figure 7:
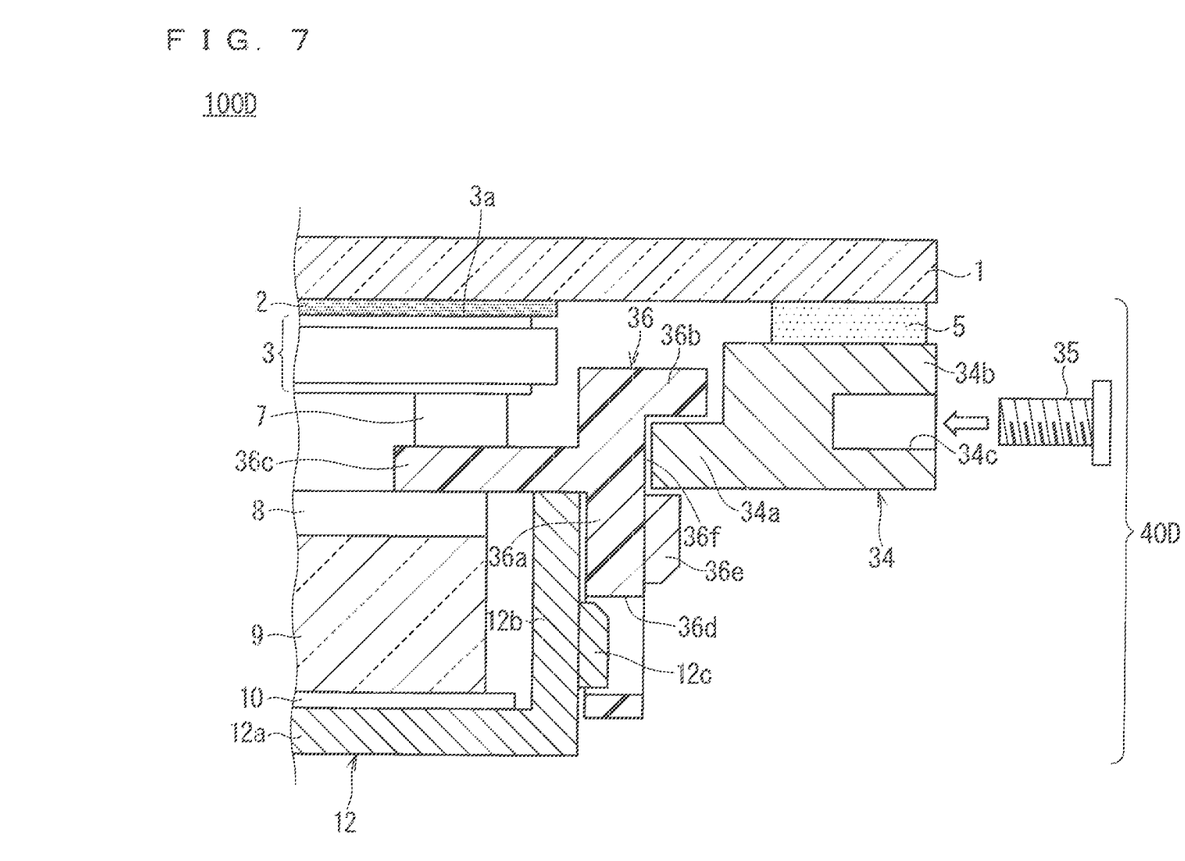
FIG. 7 is a sectional view illustrating a state before a screw is attached to a display device according to a second modification of the third preferred embodiment.

Subsequently, a modification of the third preferred embodiment will be described. FIG. 6 is a sectional view illustrating a state before a screw 35 is attached to a display device 1000 according to a first modification of the third preferred embodiment. FIG. 7 is a sectional view illustrating a state before the screw 35 is attached to a display device 100D according to a second modification of the third preferred embodiment.

As illustrated in FIG. 6, a backlight 40C of the display device 100C according to the first modification of the third preferred embodiment further includes a screw hole 34c and a screw 35 in contrast to the backlight 40B. The screw hole 34c is provided at a portion in the flange frame 34 on a side opposite to the display surface 3a, and is more specifically provided in a lower end portion of the flange frame 34. While the sidewall portion 34a is in contact with the recessed portion 36f, the screw 35 is screwed into the screw hole 34c from the side opposite to the display surface 3a, and more specifically from a back surface side of the display panel 3, and then the flange frame 34 is fixed to a member to be attached (not illustrated). The member to be attached is a housing for attaching the display device, for example.

Thus, the display device 1000 can be fixed to the member to be attached while positioning of the mold frame 36 and the flange frame 34 in the vertical direction in the paper-surface of FIG. 6, or in the thickness direction of the backlight 40C, is performed.

Subsequently, the second modification of the third preferred embodiment will be described. As illustrated in FIG. 7, a backlight 40D of the display device 100D according to the second modification of the third preferred embodiment further includes a screw hole 34c and a screw 35 in contrast to the backlight 40B. The screw hole 34c is provided in an outer peripheral portion of the flange frame 34. While the sidewall portion 34a is in contact with the recessed portion 36f, the screw 35 is screwed into the screw hole 34c from an outer peripheral side of the flange frame 34, and then the flange frame 34 is fixed to a member to be attached (not illustrated).

Thus, the display device 100D can be fixed to the member to be attached while positioning of the mold frame 36 and the flange frame 34 in the vertical direction in the paper-surface of FIG. 7, or in the thickness direction of the backlight 40D, is performed. In addition, the flange frame 34 can be fixed from the side, so that an operator can easily work.

While the screw holes 34c are disposed on all sides in the outer peripheral portion of the flange frame 34 in the first and second modifications of the third preferred embodiment, the number of screw holes 34c disposed in each side is not limited. A plurality of screw holes 34c needs to be disposed in each side so as to resist use environment of each of the display devices 100C, 100D.

In the present invention, each of the embodiments may be freely combined, or appropriately modified, within the scope of the invention, and any of the embodiments may be eliminated.

While the invention has been shown and described in detail, the foregoing description is in all aspects illustrative and not restrictive. It is therefore understood that numerous modifications and variations can be devised without departing from the scope of the invention.

What is claimed is:
1. A display device comprising:
   a display panel;
   a protective member that is disposed on a display surface side of said display panel, and has an end portion extending outward from an end portion of said display panel;

a first frame that is disposed on an opposite side to said display surface of said display panel, and constitutes at least a side surface of a backlight except a back surface of said backlight; and a second frame that is disposed outside said first frame, and includes a sidewall portion fixed to said first frame or in contact with said first frame, and a peripheral portion extending outward from an upper end portion of said sidewall portion, said peripheral portion being fixed to a peripheral portion of said protective member, wherein a contact portion is provided in a bottom wall portion extending inward from a lower end portion of said sidewall portion of said second frame so that positioning of said first frame is performed by bringing a lower end portion of said first frame into contact with said contact portion.

2. The display device according to claim 1, wherein
a fitting tab is provided at a portion in said first frame, said portion facing said sidewall portion of said second frame,
a fitting hole is provided in said sidewall portion of said second frame to allow said fitting tab to be fitted into said fitting hole, and
said fitting tab is fitted into said fitting hole to fix said second frame to said first frame.

3. The display device according to claim 2, wherein
a protrusion for positioning is provided in a periphery of said fitting tab in said first frame, and
a hole is provided in a periphery of said fitting hole in said second frame to allow said protrusion to be inserted into said hole.

4. The display device according to claim 1, wherein
said second frame has a thickness 1.5 or more times a thickness of said first frame.

5. The display device according to claim 1, wherein
said second frame is formed of metal by mold fabrication.

6. The display device according to claim 1, wherein
said second frame is molded by inserting metal into a resin molding.

7. The display device according to claim 1, wherein
a recessed portion is provided at a portion in said first frame, said portion facing said sidewall portion of said second frame,
said sidewall portion is formed so as to be able to come into contact with said recessed portion,
a screw hole is provided at a portion in said second frame, said portion being on an opposite side to said display surface, and
a screw is screwed into said screw hole from said opposite side to said display surface to fix said display device to a member to be attached while said sidewall portion is in contact with said recessed portion.

8. A display device comprising:
a display panel;
a protective member that is disposed on a display surface side of said display panel, and has an end portion extending outward from an end portion of said display panel;
a first frame that is disposed on an opposite side to said display surface of said display panel, and constitutes at least a side surface of a backlight except a back surface of said backlight; and
a second frame that is disposed outside said first frame, and includes a sidewall portion fixed to said first frame or in contact with said first frame, and a peripheral portion extending outward from an upper end portion of said sidewall portion, said peripheral portion being fixed to a peripheral portion of said protective member, wherein
a recessed portion is provided at a portion in said first frame, said portion facing said sidewall portion of said second frame,
said sidewall portion is formed so as to be able to come into contact with said recessed portion,
a screw hole is provided in an outer peripheral portion of said second frame, and
a screw is screwed into said screw hole from an outer peripheral portion side of said second frame to fix said display device to a member to be attached while said sidewall portion is in contact with said recessed portion.

* * * * *